US007555223B2

(12) United States Patent
Kawanishi et al.

(10) Patent No.: US 7,555,223 B2
(45) Date of Patent: *Jun. 30, 2009

(54) UWB SIGNAL GENERATOR USING OPTICAL FSK MODULATOR

(75) Inventors: Tetsuya Kawanishi, Koganei (JP); Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 608 days.

This patent is subject to a terminal disclaimer.

(21) Appl. No.: 11/038,767

(22) Filed: Jan. 21, 2005

(65) Prior Publication Data

US 2005/0175357 A1 Aug. 11, 2005

(30) Foreign Application Priority Data

Jan. 23, 2004 (JP) .............................. 2004-016362

(51) Int. Cl.
*H04B 10/04* (2006.01)
*H04B 10/12* (2006.01)
*G02F 1/00* (2006.01)

(52) U.S. Cl. .............................. 398/185; 385/2; 359/245

(58) Field of Classification Search ................. 398/185, 398/186, 187; 385/1, 2; 359/238, 245, 276, 359/278

See application file for complete search history.

(56) References Cited

U.S. PATENT DOCUMENTS 6,700,905 B1 * 3/2004 Karasawa et al. ............. 372/21

| 7,013,090 | B2 * | 3/2006 | Adachi et al. ............... 398/183 |
| 2002/0171900 | A1 * | 11/2002 | Ono et al. .................... 359/181 |
| 2003/0147646 | A1 * | 8/2003 | Zitelli .......................... 398/65 |
| 2005/0111853 | A1 * | 5/2005 | Kawanishi et al. .......... 398/187 |

FOREIGN PATENT DOCUMENTS

| JP | 05-091047 A | 4/1993 |
| JP | 11-295674 A | 10/1999 |
| JP | 2002-268025 A | 9/2002 |

OTHER PUBLICATIONS

Kawanishi et al., Optical frequency shift by using optical SSB modulator, Technical Report of IEICE, vol. 103, No. 171, Jul. 2003, pp. 5-8.*

Kawanishi et al., Analysis of Tunable Delay-Line Using an Optical Single-Sideband Modulator, IEICE Trans. Electron, vol. E86-C, No. 7, Jul. 2003, pp. 1230-1235.*

Izutsu et al., Integrated Optical SSB Modulator/Frequency Shifter, IEEE Journal of Quantum Electronics, vol. QE-17, No. 11, Nov. 1981, pp. 2225-2227.*

(Continued)

*Primary Examiner*—Nathan M Curs
(74) *Attorney, Agent, or Firm*—Westerman, Hattori, Daniels & Adrian, LLP.

(57) ABSTRACT

A UWB signal generator includes: a laser light source for generating laser light, an optical intensity modulator for modulating an intensity of laser light from the laser light source, a signal source of the optical intensity modulator for outputting a signal transmitted to the optical intensity modulator, an optical frequency shift keying (optical FSK) modulator to which output light from the optical intensity modulator is input, a signal source for controlling a signal transmitted to an $RF_C$ electrode of the optical FSK modulator, a high-frequency electric signal source for controlling a signal transmitted to an $RF_A$ electrode and an $RF_B$ electrode of the optical FSK modulator, and a high-speed photodetector for detecting an output from the optical FSK modulator.

8 Claims, 6 Drawing Sheets

OTHER PUBLICATIONS

Higuma et al., X-cut lithium niobate optical single-sideband modulator, Electronics Letters, Apr. 12, 2001, vol. 37, No. 8, pp. 515-516.*

Kawanishi et al., High-Speed Optical Modulators and Photonic Sideband Management, Laser Review, vol. 30, No. 10, 2002, pp. 576-580.*

Office Action (Notice of Reasons for Rejection) issued in Japanese Appln. 2004-297901, dated Oct. 12, 2006 with Concise Explanation of Relevance.

Kawanishi, et al., Suppression of Optical Harmonics in Wavelength Conversion Using Optical Single-Sideband Modulator, OFC 2003, vol. 2, FP7, pp. 771-772, Published in English.

Kawanishi, et al., Optical frequency shift by using optical SSB modulator, Technical Report of IEICE, vol. 103, No. 171, Jul. 2003, pp. 5-8, Published in English.

Kawanishi, et al., Analysis of Tunable Delay-Line Using an Optical Single-Sideband Modulator, IEICE Trans. Electron., vol. E86-C, No. 7, Jul. 2003, pp. 1230-1235, Published in English.

Izutsu, et al., Integrated Optical SSB Modulator/Frequency Shifter, IEEE Journal of Quantum Electronics, vol. QE-17, No. 11, Nov. 1981, pp. 2225-2227, Published in English.

Higuma, et al., X-cut lithium niobate optical single-sideband modulator, Electronics Letters, Apr. 12, 2001, vol. 37, No. 8, pp. 515-516, Published in English.

Kawanishi, et al., High-Speed Optical Modulators and Photonic Sideband Management, Laser Review, vol. 30, No. 10, 2002, pp. 576-580.

* cited by examiner

UWB SIGNAL GENERATOR USING OPTICAL FSK MODULATOR

FIELD OF INVENTION

The present invention relates to a UWB signal generator and the like using an optical FSK modulator.

BACKGROUND OF THE INVENTION

In recent years, a UWB technique has attracted attention in an effort to further increase in speed of short-distance wireless communication in a wireless LAN or the like. The UWB is an abbreviation of a Ultra-Wide Band. The UWB technique is a wireless communication technique using a short-pulse RF signal. The UWB technique is characterized in that a frequency band occupied by a signal is ultra wide. At the present, a frequency is allocated in a microwave band under FCC in the USA, and the UWB technique is developed in an effort to realize the UWB technique around a several-gigahertz band. On the other hand, in research institutes, a millimetric-wave band UWB technique also begins to be examined to realize a gigabit-class wireless LAN. As methods of generating UWB signals, an IR (Impulse Radio) and a DS-SS (Direct Sequence Spread Spectrum) method are known for generating UWB signals.

FIG. 10 shows an example of a UWB signal generator based on the IR method (see IEICE Proceedings of the 2003 Electronics Society, p. 343). A UWB signal generator 101 in this example includes an optical pulse generator 102, an optical intensity modulator 103, a UTC-PD (uni-Traveling Carrier Photodiode) 104, and an antenna 105. An operation of the UWB signal generator will be described below. The optical pulse generator 102 outputs an optical pulse string having a half bandwidth of about 400 fs and output at a repetition frequency of 1 GHz. The optical intensity modulator 103 superposes $2^{31}-1$ PRBS (Pseudo Random Bit Sequence) signals on the optical pulse string. The UTC-PD 104 converts the optical signal into an electric pulse signal having a half bandwidth of about 7 ps. The antenna 105 has a center frequency of about 120 GHz and an occupied band of about 49 GHz to release the electric pulse signal.

On the other hand, a receiver 106 includes an antenna 107, an SBD (Shottky Barrier Diode) 108, and an amplifier 109. An output from the receiver 106 is observed by an oscilloscope 110. The electric pulse signal released from the UWB signal generator is received by an antenna having the same characteristics as those of the above antenna. The SBD 108 envelope-detects the electric pulse signal received by the antenna. The amplifier 109 amplifies the electric pulse detected by the SBD 108. The oscilloscope observes a waveform of the electric pulse amplified by the amplifier. In this manner, data transmission at 1 Gbit/s can be achieved.

However, in this signal generator, since only an electric pulse matched with the characteristics of the antenna is output, the electric pulse cannot be transmitted simultaneously with another signal. Another disadvantage is that the signal generator must use pulse light. In the signal generator, since the output pulse mainly depends the characteristics of the antenna, a center frequency or a band is disadvantageously limited. In the signal generator, many pieces of light having frequencies which are not actually transmitted are wastefully generated.

In a UWB signal generator based on the DS-SS (Direct Sequence Spread Spectrum) method, a microwave/millimetric-wave UWB signal is generated by an optical heterodyne method. The UWB signal generator includes a signal source, two lasers, a phase lock loop, a Mach-Zehnder modulator, a bias power supply, a pulse pattern generator, a photodiode, and a spectrum analyzer. In the signal generator, the Mach-Zehnder modulator superposes carrier signals by phase modulation, the two lasers are synchronized in phase by the phase lock loop, and a UWB signal is generated by heterodyne extraction. In the signal generator, a stability control mechanism is disadvantageously complex and expensive.

SUMMARY OF THE INVENTION

It is an object of the present invention to provide a UWB signal generator using an optical FSK modulator which can be used in optical information communication or the like.

It is another object of the present invention to provide a UWB signal generator using an optical FSK modulator which can be used in optical information communication or the like and which can transmit information at a high speed.

It is still another object of the present invention to provide a UWB signal generator which can use CW (continuous wave) light as laser light.

It is still another object of the present invention to provide a UWB signal generator which can be used in wavelength division multiplexing (WDM) communication.

It is still another object of the present invention to provide a UWB signal generator the output band of which can be easily controlled.

It is still another object of the present invention to provide a UWB signal generator which can control a pulse shape of a UWB signal.

It is still another object of the present invention to provide a signal generator which can simultaneously generate an intensity modulating signal and a UWB signal.

It is still another object of the present invention to provide a signal generator which can simultaneously generate an intensity modulating signal and a UWB signal without using WDM.

According to the present invention, there is provided a UWB signal generator using an optical FSK modulator having a laser light source for generating laser light, an optical intensity modulator for modulating an intensity of the laser light from the laser light source, a shift keying (optical FSK) modulator to which output light from the optical intensity modulator is input, a signal source for controlling a signal transmitted to an $RF_C$ electrode of the optical FSK modulator, a high-frequency electric signal source for controlling signals transmitted to an $RF_A$ electrode and an $RF_B$ electrode of the optical FSK modulator, and a high-speed photodetector for detecting an output from the optical FSK modulator.

In the optical FSK modulator, an average output optical intensity does not depend on a voltage at the $RF_C$ electrode. For this reason, the UWB signal generator according to the present invention using the optical FSK modulator has a constant average output. Therefore, the UWB signal generator according to the present invention can simultaneously perform generation of a UWB signal and another modulation method (OOK or the like) using an average output such as an intensity modulating signal.

Since a carrier frequency of a UWB signal in the UWB signal generator according to the present invention is twice the frequency of a high-frequency electric signal source, a signal having a high-frequency component can be generated, and the frequency can be easily controlled. Since a pulse waveform of the UWB signal in the UWB signal generator according to the present invention depends on an $RF_C$ signal waveform, for example, rise time or the like is controlled to make it possible to easily control the pulse waveform of the UWB signal.

According to another embodiment of the present invention, the optical FSK modulator preferably includes a first sub Mach-Zehnder waveguide ($MZ_A$), a second sub Mach-Zehnder waveguide ($MZ_B$), and a main Mach-Zehnder waveguide ($MZ_C$) having the $MZ_A$, the $MZ_B$, a light input unit, and an output unit for modulated light, a first direct-current or low-frequency electrode ($DC_A$ electrode) which controls a bias voltage between two arms composing the $MZ_A$ to control a phase of light propagating in the two arms of the $MZ_A$, a second direct-current or low-frequency electrode ($DC_B$ electrode) which controls a bias voltage between two arms composing the $MZ_B$ to control a phase of light propagating in the two arms of the $MZ_B$, a first RF electrode ($RF_A$ electrode) for inputting a radio frequency (RF) signal to the two arms composing the $MZ_A$, a second RF electrode ($RF_B$ electrode) for inputting an RF signal to the two arms composing the $MZ_B$, and a traveling-wave type electrode ($RF_C$ electrode) which controls a frequency of an input RF signal to control a frequency of light output from the output unit.

According to another embodiment of the present invention, the UWB signal generator can be used in a waveform division multiplexing communication system.

According to another embodiment of the present invention, the intensity modulating signal and UWB signal generator includes a laser light source for generating laser light, an optical intensity modulator for modulating an intensity of the laser light from the laser light source, a signal source of the optical intensity modulator for outputting a signal transmitted to the optical intensity modulator, an optical frequency shift keying (optical FSK) modulator for inputting output light from the optical intensity modulator, a signal source for controlling a signal transmitted to an $RF_C$ electrode of the optical FSK modulator, a high-frequency electric signal source for controlling a signal transmitted to an $RF_A$ electrode and the $RF_B$ electrode of the optical FSK modulator, and a photodetector.

According to another embodiment of the present invention, the intensity modulating signal and UWB signal generator preferably includes an optical intensity amplifier for amplifying an output from the high-speed photodetector.

According to another embodiment of the present invention, in the intensity modulating signal and UWB signal generator, the optical FSK modulator preferably includes a first sub Mach-Zehnder waveguide ($MZ_A$), a second sub Mach-Zehnder waveguide ($MZ_B$), a main Mach-Zehnder waveguide ($MZ_C$) having the $MZ_A$, the $MZ_B$, a light input unit, and an output unit for modulated light, a first DC or low-frequency electrode ($DC_A$ electrode) which controls a bias voltage between two arms composing the $MZ_A$ to control a phase of light propagating in the two arms of the $MZ_A$, a second direct-current or low-frequency electrode ($DC_B$ electrode) which controls a bias voltage between two arms composing the $MZ_B$ to control a phase of light propagating in the two arms of the $MZ_B$, a first RF electrode ($RF_A$ electrode) for inputting a radio frequency (RF) signal to the two arms composing the $MZ_A$, a second RF electrode ($RF_B$ electrode) for inputting an RF signal to the two arms composing the $MZ_B$, and a traveling-wave type electrode ($RF_C$ electrode) which controls a frequency of an input RF signal to control a frequency of light output from the output unit.

According to the present invention, a UWB signal generator using an optical FSK modulator can be used in optical information communication or the like.

According to the present invention, a UWB signal generator using an optical FSK modulator which can be used in optical information communication or the like and which can transmit information at a high speed.

According to the present invention, unlike in a conventional technique which generates a UWB signal by using a filter (antenna), an optical FSK modulator is used to make it possible to provide a UWB signal generator which uses CW (continuous) light as laser light.

According to the present invention, a UWB signal generator can be used in wavelength division multiplexing (WDM) communication.

According to the present invention, a UWB signal generator can easily control an output band because a carrier frequency of a UWB signal that is twice the frequency of a high-frequency electric signal source can be provided.

According to the present invention, a UWB signal generator can control a pulse wave of a UWB signal because a pulse waveform of the UWB signal that depends on an $RF_C$ signal waveform can be provided.

According to the present invention, a UWB signal generator can simultaneously generate an intensity modulating signal and a UWB signal because the average output of the UWB signal generator is constant.

According to the present invention, a signal generator which can simultaneously generate an intensity modulating signal and a UWB signal without using WDM can be provided. More specifically, according to the present invention, at least one of the above advantages can be achieved.

DETAILED DESCRIPTION OF THE INVENTION

In an optical FSK modulator, an upper side band and a lower side band which are transiently, simultaneously generated in a switching operation interfere with each other to generate a component having a frequency which is twice an RF signal frequency ($f_{FSK}$) of the optical FSK modulator. When output light from a modulator is guided to a photodetector (high-speed photodetector) which can respond to a frequency component having a frequency which is a frequency difference or more of the two components (which is twice or more RF signal frequencies input to an $RF_A$ electrode and an $RF_B$ electrode), an RF signal having a frequency corresponding to the frequency difference is generated only while the two components are simultaneously generated. Since this phenomenon is a transitive phenomenon occurring in a frequency switching state, when a signal ($RF_C$) for switching optical frequencies is assumed as a rectangular pulse having short rise/fall time, an RF signal can be generated. The UWB signal generator using an optical FSK modulator according to the present invention (to be referred to as a "UWB signal generator according to the present invention" hereinafter) outputs the RF signal (millimetric wave/microwave pulse) as a UWB signal.

Figure 1:
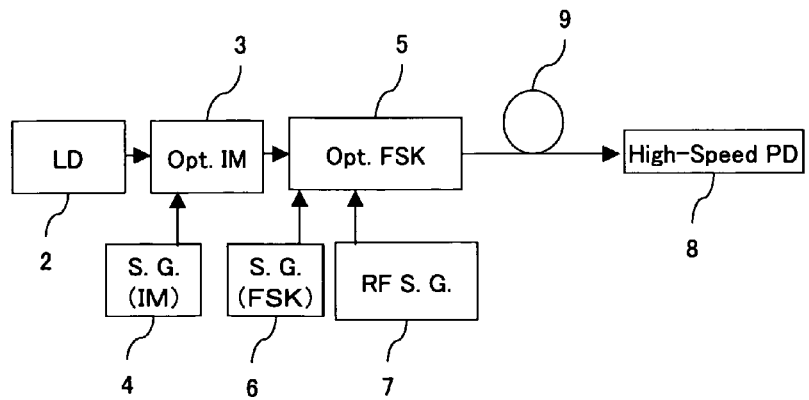
FIG. 1 is a schematic view showing a basic arrangement of a UWB signal generator according to the present invention.

An example of the UWB signal generator according to the present invention will be described below with reference to the accompanying drawings. FIG. 1 is a schematic diagram showing a basic arrangement of the UWB signal generator in FIG. 1. As shown in FIG. 1, the UWB signal generator 1 includes a laser light source 2, an optical intensity modulator 3, a signal source 4 of the optical intensity modulator, an optical frequency shift keying modulator (optical FSK) 5, an switching signal source 6, a high-frequency electric signal source 7 of the optical FSK modulator, and a high-speed photodetector 8 for detecting an output from the optical FSK modulator. In FIG. 1, reference numeral 9 denotes a fiber. Basic elements of the UWB signal generator according to the present invention will be described below.

The laser light source 2 is a device for generating laser light. As the laser light source, a laser light source having a CW wavelength can also be used. In a conventional UWB signal generator, a pulse light source must be adopted as a light source (see IEICE Proceedings of the 2003 Electronics Society, p. 343). However, in the present invention, a method that generates an UWB signal by an antenna as in the conventional UWB signal generator is not adopted, and an optical FSK method is adopted. For this reason, a laser light source having a CW wavelength can be used. In this specification, the explanation will be performed on the assumption that a number of frequency of light output from the laser light source is set at $f_0$.

The laser light source includes a semiconductor laser. A laser device in which an optical intensity modulator (to be described later) is built may also be used.

As value $f_0$, which is the number of frequency of the light output from the laser light source, 100 THz or more is preferably set because stable laser light can be used. The value $f_0$ is preferably set at 170 THz or more because an existing fiber can be used. The value $f_0$ is more preferably set at 190 to 250 THz because information can be transmitted through a fiber with low loss.

As an intensity of light output from the laser light source, 0.1 mW or more is set, 1 mW or more is preferably set, or 10 mW or more is more preferably set.

The optical intensity modulator 3 is a device for modulating an intensity of laser light from the laser light source. As the optical intensity modulator 3, a known optical intensity modulation can be adopted. As such an optical intensity modulator, a LN modulator or the like is used. The optical intensity modulator modulates an amplitude of the laser light. At this time, a band width of the modulated laser light is set at $\Delta f_{sig}$ in this specification. As the optical intensity modulator, a modulator which is built in a laser device and which directly modulates laser light may be used. However, an optical intensity modulator arranged independently of the laser light source is preferably used.

The signal source 4 of the optical intensity modulator is a device for outputting a signal to be transmitted to the optical intensity modulator. As the signal source 4, a known intensity modulating signal source can be adopted.

The optical frequency shift keying modulator 5 is a device which modulates a frequency of light to transmit a difference between frequencies as a signal. The optical frequency shift keying modulator 5 can switch output frequencies at a speed higher than that of a conventional optical SSB modulator [T. Kawanishi and M. Izutsu, "Optical FSK modulator using an integrated lightwave circuit consisting of four optical phase modulator", CPT 2004 G-2, Tokyo, Japan, 14-16 Jan. 2004]. An example of the optical FSK modulator used in the present invention will be described below with reference to the accompanying drawings.

Figure 2:
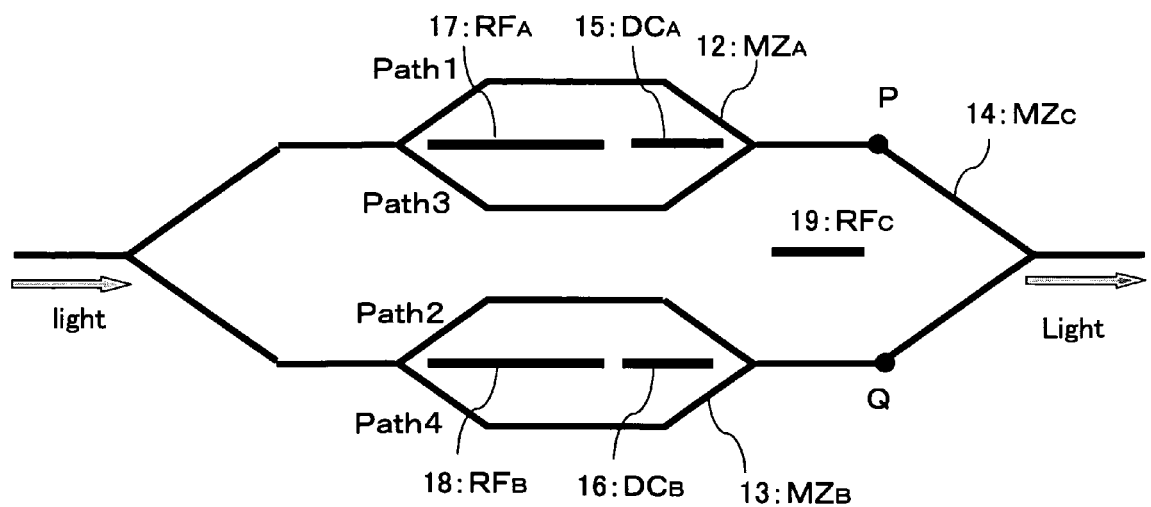
FIG. 2 is a diagram showing a basic arrangement of an optical FSK modulator.

FIG. 2 is a diagram showing a basic arrangement of the optical FSK modulator. As shown in FIG. 2, a basic arrangement 11 of the optical FSK modulator includes a first sub Mach-Zehnder waveguide ($MZ_A$) 12, a second sub Mach-Zehnder waveguide ($MZ_B$) 13, a main Mach-Zehnder waveguide ($MZ_C$) including the $MZ_A$, the $MZ_B$, a light input unit, and an output unit for modulated light, a first direct-current or low-frequency electrode ($DC_A$ electrode) 15 which controls a bias voltage between two arms composing $MZ_A$ to control a phase of light propagating in the two arms of $MZ_A$, a second direct-current or low-frequency electrode ($DC_B$ electrode) 16 which controls a bias voltage between two arms composing the $MZ_B$ to control a phase of light propagating in the two arms of the $MZ_B$, a first RF electrode ($RF_A$ electrode) 17 for inputting a radio frequency (RF) signal to the two arms composing the $MZ_A$, a second RF electrode ($RF_B$ electrode) 18 for inputting an RF signal to the two arms composing the $MZ_B$, and a traveling-wave type electrode ($RF_C$ electrode) 19 which controls a frequency of an input RF signal to control a frequency of light output from the output unit.

Each of the Mach-Zehnder waveguides composing the optical FSK modulator is arranged to include, e.g., two parallel phase modulators. In the example in FIG. 2, the first sub Mach-Zehnder waveguide ($MZ_A$), the second sub Mach-Zehnder waveguide ($MZ_B$), and the main Mach-Zehnder waveguide ($MZ_C$). The $MZ_C$ includes the $MZ_A$, the $MZ_B$, a light input unit, and an output unit for modulated light.

As a material of the substrate of the optical FSK modulator, an electro-optic crystal such as lithium niobate, lithium tantalate, and lithium niobate-lithium tantalate solid solution is preferable, and an X-cut $LiNbO_3$ substrate is preferable in particular. As a method of forming an optical waveguide, a known formation method such as an internal diffusion method of a titanium diffusion method and the like or a proton exchange method can be used. More specifically, the optical FSK modulator according to the present invention can be manufactured, for example, as follows: firstly, titanium is patterned on a lithium niobate wafer by a photolithographic method, and the titanium is diffused by a thermal diffusion method to form an optical waveguide. Conditions set in this case may be as follows: thickness of the titanium within 100 to 2000 angstroms, diffusion temperature within 500 to 2000° C., and diffusion time within 10 to 40 hours. On a major surface of the substrate, an insulation buffer layer (thickness of 0.5 to 2 μm) of silicon dioxide is formed. An electrode consisting of a metallic plating having a thicknesses of 15 to 30 μm is formed on the insulating buffer layer, and then the wafer is cut. In this manner, an optical modulator on which a titanium diffused waveguide is formed is formed.

A resonant-type optical electrode (resonant-type optical modulator) is an electrode for performing modulation using resonance of a modulation signal. A known resonant-type electrode, for example, one described in Japanese Patent Application Laid-Open No. 2002-268025 can be adopted.

A traveling-wave-type electrode (traveling-wave-type optical modulator) is an electrode (modulator) for modulating light while guiding waves so that a light wave and an electric signal are guided in the same direction (e.g., Hiroshi Nishihara, Masamitsu Haruna, Toshiaki Suhara, "optical integrated circuit" (revised and updated edition), Ohmsha, pages 119 to 120). A known traveling-wave-type electrode such as those disclosed in Japanese Patent Application Laid-Open Nos. 11-295674, 2002-1619133, 2002-40381, 2000-267056, 2000-47159, and 10-133159, for example, can be adopted as the traveling-wave-type electrode.

A preferable traveling-wave-type electrode adopting a so-called symmetrical-type earth electrode arrangement (one provided with at least a pair of earth electrodes on both sides of a traveling-wave-type signal electrode) can be mentioned. Thus, by symmetrically arranging the earth electrodes sandwiching the signal electrode, a high frequency wave output from the signal electrode is made easy to be impressed to the earth electrodes arranged on the left and right of the signal electrode, thereby suppressing an emission of the high frequency wave to the side of the substrate. The use of the traveling-wave-type electrode also makes it possible to switch output frequencies of several ten ps or less.

An operation of the optical FSK modulator will now be described. Sinusoidal RF signals with phases different from each other by 90° are input to four optical phase modulators paralleled. Also, bias voltages for the $DC_A$ electrode, the $DC_B$ electrode, and the $RF_C$ electrode are adjusted so that mutual phase differences are respectively 90° with respect to light. In this case, light having a frequency shifted as much as the frequency of the RF signal is output. Directions of frequency shifting (decrease/increase) can be selected by setting the bias voltage. More specifically, each of the phase modulators have respective phase difference of 90° for both the electricity and light. It is to be noted that when the X-cut substrate is used, by merely providing sinusoidal waves of 90° phase difference to the $RF_A$ electrode and $RF_B$ electrode for RF signals, modulation of the RF signal at phases 0°, 90°, 180°, and 270° are respectively realized by the four phase modulators (Higuma et al., X-cut lithium niobium optical SSB modulator, electron letter, vol. 37, pp. 515 to 516 (2001)).

Figure 3:
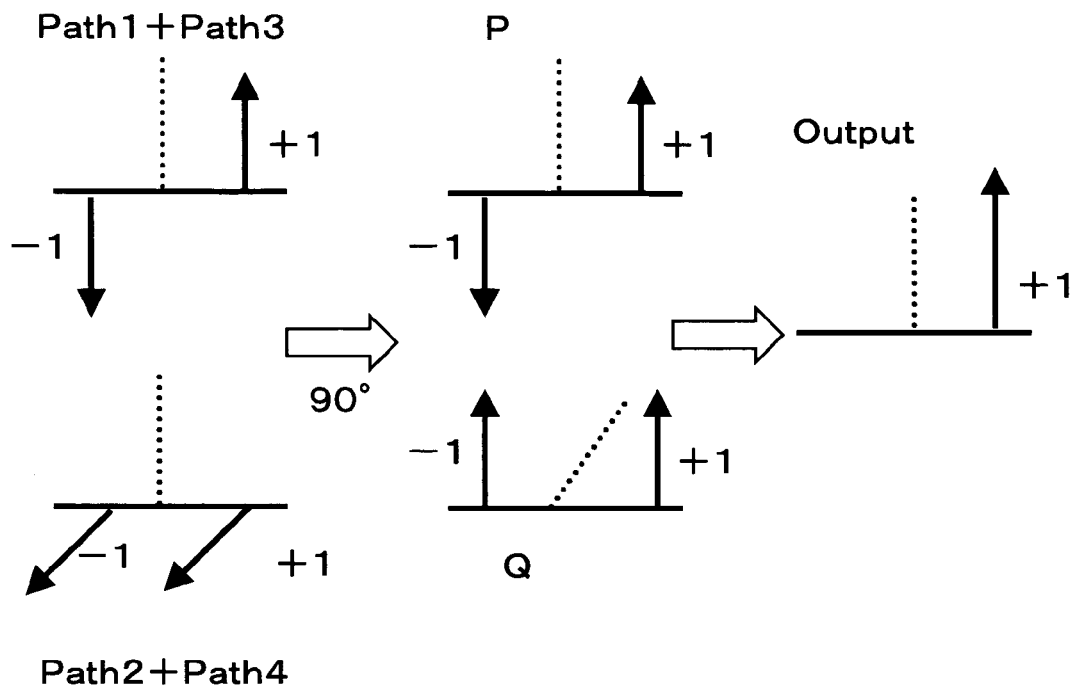
FIG. 3 shows an optical spectrum at each point of the optical FSK modulator in FIG. 2 when an upper side waveband is generated.

FIG. 3 shows an optical spectrum at each point of the optical FSK modulator. FIG. 3 also shows an example in which an upper side band is generated. Bias voltages at the $DC_A$ electrode and the $DC_B$ electrode in the respective MZ arrangement portions in FIG. 2 are adjusted so that light phase differences between two paths (path 1 and path 3, and path 2 and path 4 are 180° each. A bias voltage of the $RF_C$ electrode is adjusted so that a light phase difference of the two MZ arrangement portions is 90°. At P point and Q point in FIG. 2, both of the side bands appear, respectively. However, at the P point and Q point, the lower side band phases are opposite. Accordingly, the output light having coupled these lights include only the upper side wave component.

On the other hand, when the bias voltage of the $RF_C$ electrode is adjusted so that the optical phase difference of the two Mz arrangement portions is 270°, only the lower side wave component is output. Therefore, by switching the signal voltage of the $RF_C$ electrode, the upper side wave component and the lower side wave component can be switched to be output.

In this example, a traveling-wave-type electrode corresponding to the RF frequency is used as the $RF_C$ electrode, so that the above-mentioned frequency shifting can be performed at a high speed. However, if the frequency shifting is not performed at a high speed, a resonant-type electrode may be used as the $RF_C$ electrode.

A mathematical expression about an output spectrum of the optical FSK modulator will be described below. The optical FSK modulator is obtained by replacing an electrode corresponding to a $DC_C$ of an optical SSB modulator with a traveling-wave-type electrode ($RF_C$) coping with high-speed switching. An output spectrum of the optical FSK modulator can be basically interpreted like an output spectrum of the optical SSB modulator. Since a large number of examples of the output spectrum of the optical SSB modulator are reported, the output spectrum of the optical SSB modulator will be described below.

When a modulation signal is represented by $A^{RF} \sin \omega_m t$, a side band obtained by a single phase modulator is expressed by the following equation (1).

$$A^{LW} \exp i[\omega_0 t + A^{RF} \sin \omega_m t] = A^{LW} \sum_{n=-\infty}^{\infty} J_n(A^{RF}) \exp[i\omega_0 t + in\omega_m t] \quad (1)$$

In equation (1), reference symbol Jn(A) represents a first-type n-order Bessel function. In this equation, input light is represented by $A^{LW} \exp[i\omega_0 t]$. Reference symbol $A^{RF}$ represents an amount representing a size of a phase shift of light caused by an electric signal in a modulator. The amount is called an induced phase.

Similarly, when a modulation signal is represented by $A^{RF} \cos \omega_m t$, a side band obtained by a single phase modulation is expressed by the following equation (2).

$$A^{LW} \exp i[\omega_0 t + A^{RF} \cos \omega_m t] = A^{LW} \sum_{n=-\infty}^{\infty} i^n J_n(A^{RF}) \exp[i\omega_0 t + in\omega_m t] \quad (2)$$

Therefore, it is understood that an amplitude of an n-order side wave band: $\exp[i(\omega_0 + n\omega_m)t]$ is expressed by an n-order Bessel function.

Figure 4:
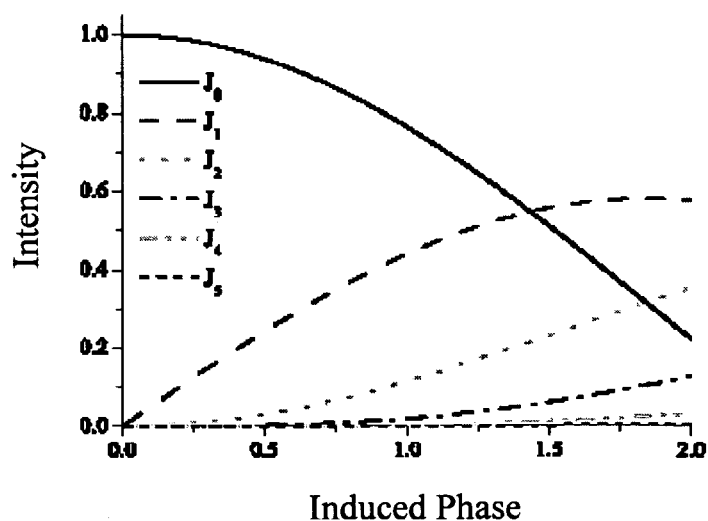
FIG. 4 is a graph showing a manner of generating a side band by phase modulation.

FIG. 4 is a graph showing a manner in which a side band is generated by phase modulation. FIG. 4 shows $J_i$ (i=0, 1, . . . , 5) in the first-type n-order Bessel function. The maximum value of $J_1(A)$ is 0.583 when A=1.841. An induced phase at which the maximum value is obtained is defined as the following equation (3) and equation (4).

$$J'_1(A_m) = 0, \quad (3)$$

$$\left( J'_1(A) \equiv \frac{dJ_1(A)}{dA}, 0 \leq A \leq \pi \right) \quad (4)$$

Since ±1-order side bands are used in optical frequency conversion performed by the optical SSB modulator, when an induced phase is set at a value exceeding $A_m$, conversion efficiency is not improved to cause generation of a unnecessary harmonic component. Therefore, only a case in which the induced phase ranges from 0 to $A_m$ will be considered.

Assumed that an amplitude and a phase of light at Path j (j=1; 2; 3; 4) in FIG. 2 are represented by $A_j^{LW}$ and $\phi_j^{LW}$, respectively, and that an amplitude and a phase of an electric field induced on an optical waveguide by an RF electric signal are represented by $A_j^{RF}$ and $\phi_j^{RF}$ respectively. In this case, when equations (1) and (2), output light E of the optical SSB modulator can be expressed by the following equations (5) to (9). A phase uses a point where four Paths are coupled to each other as a reference.

$$E = \frac{e^{-i w_0 t}}{4} \sum_{j=1}^{4} \sum_{n=-\infty}^{\infty} J_n(A_j^{RF}) \exp\{in(w_m t + \phi_j^{RF})\} A_j^{LW} e^{-i\phi_j^{LW}} \quad (5)$$

$$= \frac{e^{i\omega_0 t}}{4} \sum_{n=-\infty}^{\infty} e^{in\omega_m t} \sum_{j=1}^{4} J_n(A_j^{RF}) P_{n,j} A_j^{LW} \quad (6)$$

$$P_{n,j} \equiv \exp i\left[(1-Sn)j\frac{\pi}{2} + \Delta\phi_j^{LW} + n\Delta\phi_j^{RF}\right] \quad (7)$$

$$\phi_j^{LW} = \frac{j\pi}{2} + \Delta\phi_j^{LW}, \phi_j^{RF} = -S\frac{j\pi}{2} + \Delta\phi_j^{RF} \quad (8)$$

$$S = \pm 1, T = \pm 1 \quad (9)$$

Ideal SSB modulation is obtained when phase differences of light and electricity are given by $\pi/2$ each, i.e., $\Delta\phi_j^{LW} = \Delta\phi_j^{RE}$ and when an amplitude does not fluctuate ($A_j^{LW} = A^{LW}$, $A_j^{RF} = A^{RF}$) [S. Shimotsu, S. Oikawa, T. Saitou, N. Mitsugi, K. Kubodera, T. Kawanishi, and M. Izutsu, "LiNbO$_3$ Optical Single-Sideband Modulator" OFC 2000, PD-16]. On the other hand, an output optical spectrum is given by the following equations (10) to (12).

$$E = A^{LW} e^{i\omega_0 t} \sum_{n=0}^{\infty} J_N(A^{RF}) e^{iN\omega_m t} \quad (10)$$

$$= A^{LW} ST e^{i\omega_0 t} [J_1(A^{RF}) e^{iST\omega_m t} - J_3(A^{RF}) e^{-i3ST\omega_m t} + J_5(A^{RF}) e^{i5ST\omega_m t} - J_7(A^{RF}) e^{-i7ST\omega_m t} + \cdots] \quad (11)$$

$$N \equiv S \times T \times (2n+1) \times (-1)^n \quad (12)$$

As shown in FIG. 4, when an amplitude falls within a range smaller than $A_m$, a harmonic component of five or more orders is sufficiently small. For this reason, an output spectrum obtained when S×T=+1 is given by equation (13).

$$E \approx A^{LW} e^{i\omega_0 t} [J_1(A^{RF}) e^{i\omega_m t} - J_3(A^{RF}) e^{-i3\omega_m t}] \quad (13)$$

Since $J_1$ is larger than $J_3$, ±-order components $\exp[i(\omega_0 + \omega_m)t]$ are dominant in output light, optical frequency shifting corresponding to a modulated frequency with reference to input light $A^{LW}\exp[i\omega_0 t]$ can be realized. Conversion efficiency obtained in this case can be expressed by $J_1$. When a ratio of the +1-order component to an unnecessary harmonic component is defined by SNR [dB], $J_1/J_3$ is obtained. In this case, it is assumed that each of the optical and electric circuits has no phase difference and no amplitude difference and that a loss in the optical wavelength is zero. For this reason, $J_1$ and $J_1/J_3$ give theoretical limitations of a conversion efficiency and an SNR in optical frequency conversion performed by the optical SSB modulator.

A range of $A^{RF}$ that satisfies a conversion efficiency of -10 dB or more and an SNR of 30 dB or more is given by 0.67<$A^{RF}$<0.85. Similarly, when a case in which S×T=-1 is satisfied is considered, an output spectrum is given by equation (14).

$$E \approx A^{LW} e^{i\omega_0 t} [-J_1(A^{RF}) e^{-i\omega_m t} + J_3(A^{RF}) e^{i3\omega_m t}] \quad (14)$$

As is apparent from equation (14), an optical frequency shifts to be increased (to the upper side band) when S×T=+1 is satisfied, and shifts to be decreased (to the lower side band) when S×T=-1 is satisfied. Therefore, it is understood that the sign of T or S is changed to make it possible to realize switching of optical frequencies. A change of the sign of T can be realized by controlling a voltage applied to a DC$_C$ electrode (therefore, an RF$_C$ electrode in the optical FSK modulator) and switching optical phase differences between the Paths 1 and 3 and the Paths 2 and 4 from $-\pi/2$ to $\pi/2$. On the other hand, the sign of S can be changed by switching a phase difference of RF signals of the RF$_A$ and RF$_B$ electrodes from $\pi/2$ to $-\pi/2$.

As described above, in the optical FSK modulator shown in FIG. 2, an electrode corresponding to the DC$_C$ electrode of the conventional optical SSB modulator is replaced with a traveling-wave-type electrode (RF$_C$) coping with high-speed switching to realize switching of the sign of T at a high speed. An amplitude of the switching signal corresponds to a half-wave voltage of the RF$_C$ electrode.

In this case, a range of frequency modulation performed by the optical FSK modulator is represented by $\Delta f_{FSK}$, $\Delta f_{FSK} > \Delta f_{sig}$ is satisfied. For example, when $\Delta f_{sig}$ and $\Delta f_{FSK}$ are given by 10 GHz and 25 GHz, respectively, a UWB signal having a frequency of 50 GHz is generated. As described above, $\Delta f_{sig}$ denotes a bandwidth of laser light the intensity of which is modulated by a light intensity modulator.

The UWB signal generator according to the present invention can also be used in wavelength division multiplexing (WDM) communication. In the WDM communication performed by using the UWB signal generator according to the present invention, when frequency intervals are given by $\Delta f_{WDM}$, a relation given by $\Delta f_{WDM} > (\Delta f_{FSK} + \Delta f_{sig}) \times 2$ may be satisfied. For example, when $\Delta f_{sig}$ and $\Delta f_{FSK}$ are 10 GHz and 25 GHz, respectively, 100 GHz may be set as $\Delta f_{WDM}$.

As described above, according to the optical FSK modulator, an average output light intensity does not depend on a voltage at the RF$_C$ electrode. Therefore, in the UWB signal generator according to the present invention using the optical FSK modulator, an average output is constant to make it possible to perform the modulation simultaneously with modulation of another modulation method (OOK or the like) using an average output of intensity modulation signals or the like in accordance with a UWB signal.

The signal source 6 is a device for outputting a signal to be transmitted to the optical FSK modulator, for which a known signal source can be adopted. The use of a signal source (FSK signal source) of an optical FSK modulator which can set a plurality of voltage levels to be switched over is an aspect related to the optical FSK communication capable of providing multivalued modulation. As a signal to be input from the signal source to the RF$_C$ electrode, a signal having a frequency component of preferably between 500 MHz and 300 GHz both inclusive can be mentioned, which preferably assumes 500 MHz to 10 GHz. It is to be noted that the frequency of the signal transmitted to the RF$_C$ electrode controlled by the signal source is preferably smaller compared to the frequencies of the signals transmitted to the RF$_A$ electrode and the RF$_B$ electrode controlled by the high-frequency electric signal source later described. This is because the apparatus becomes complicated if the frequency of the signal transmitted to be RF$_C$ electrode controlled by the signal source is larger compared to the frequencies of the signals transmitted to the RF$_A$ electrode and the RF$_B$ electrode controlled by the high-frequency electric signal source later described.

The high-frequency electric signal source 7 is a device for controlling the signals to be transmitted to the RF$_A$ electrode and the RF$_B$ electrode and a known high-frequency electric signal source can be adopted therefor. For example, 1 GHz to 100 GHz can be mentioned as the high frequency. As an output of the high-frequency electric signal source, a sinusoidal wave having a fixed frequency can be mentioned.

A high-speed photodetector is a photodetector that can respond a frequency twice or more the frequency of an RF signal input to the $RF_A$ electrode and the $RF_B$ electrode.

Generation of a UWB signal by using the UWB signal generator according to the present invention is described below. As described above, an output from the optical FSK modulator can be switched between a upper side band and a lower side band by a change in voltage on the $RF_C$ electrode. When phase differences between optical signals of the Paths 1 and 3 and the Paths 2 and 4 are represented by $\phi_{FSK}$, the amplitudes of the upper side band and the lower side band are given by the following equations (15) and (16), respectively:

$$J_1(A^{RF})[1+\exp(i_{\phi FSK})]/2 \quad (15)$$

$$J_1(A^{RF})[-1+\exp(-i_{\phi FSK})]/2 \quad (16)$$

Only the upper side band is output when $\phi_{FSK}=0$. On the other hand, only the lower side band is output when $\phi_{FSK}=\pi$. In any case, an average output light intensity is given by $J_1(A^{RF})$, and does not depend on $\phi_{FSK}$.

Figure 5:
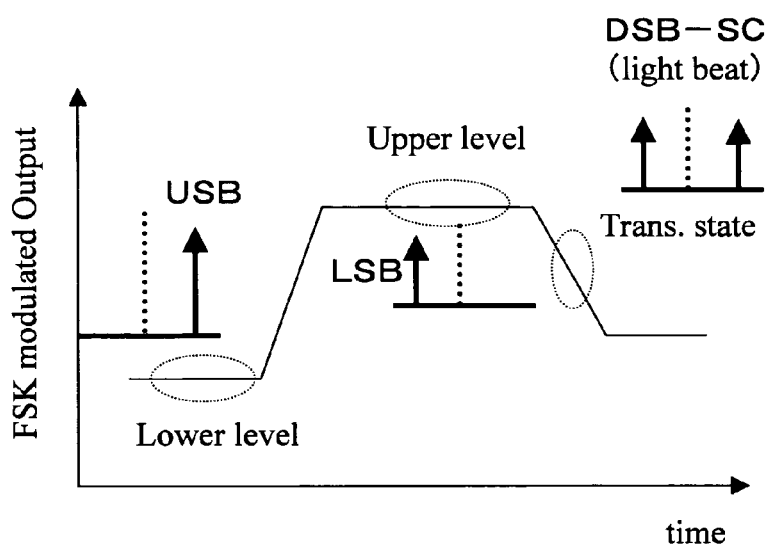
FIG. 5 is a graph for explaining generation of a UWB signal by optical FSK modulation.

FIG. 5 is a diagram for explaining generation of a UWB signal by optical FSK modulation. For rise time and fall time of a switching pulse on the $RF_C$ electrode, an upper side band and a lower side band simultaneously exist. When the upper and lower side bands are converted into electric signals by a high-speed photodetector, an RF signal corresponding to a frequency difference ($2f_m$) between the upper side band and the lower side band is obtained as an optical beat. The rise time and the fall time are limited by the bands of the electrodes and the drive circuit. However, when a traveling-wave-type electrode (and a driver) is used, the rise time and the fall time can be set at about 10 ps. The upper limit of frequency modulation of FSK is similarly limited by a band of a modulation electrode and set at about 60 GHz. Therefore, when the UWB signal generator is used, a UWB signal having a carrier frequency of 120 GHz and a pulse width of 10 ps can be generated.

In a UWB signal output method obtained by the UWB signal generator according to the present invention, an FSK switching signal does not affect an average output light intensity. This means that the range of a change in intensity by FSK modulation on a frequency axis is limited to about a carrier frequency of the UWB signal. In an UWB generation technique, which has been proposed, a method of extracting only a desired spectral component of a filter (antenna) after a short pulse is generated is used. However, in the method obtained by the optical FSK modulator proposed here, as described above, an unnecessary spectrum is not generated, and only a component necessary for UWB communication can be selectively obtained. More specifically, only a necessary component is generated as an RF signal not to affect an optical base band. Since a spectral range is determined by the rise time and the fall time of an FSK switching signal, the range spectral range can be easily controlled. The carrier frequency is twice the frequency $f_m$ of a sinusoidal wave to be supplied to the $RF_A$ and $RF_B$ electrodes.

Since the carrier frequency of a UWB signal is twice the frequency of a high-frequency electric signal source, a signal having a high-frequency component, and the frequency can be easily controlled. Since the pulse waveform of the UWB signal is determined by an $RF_C$ signal waveform, for example, the pulse waveform of the UWB signal can be easily controlled by adjusting the rise time or the like.

An intensity modulation signal and UWB signal generator using an optical FSK modulator according to the present invention (to be also simply referred to as an "intensity modulating signal/UWB signal generator according to the present invention" hereinafter) is a device which can output an intensity modulating signal and a UWB signal by combining a UWB signal generator according to the present invention to a photodetector. A practical example of the intensity modulating signal/UWB signal generator according to the present invention will be described below with reference to the accompanying drawings.

Figure 6:
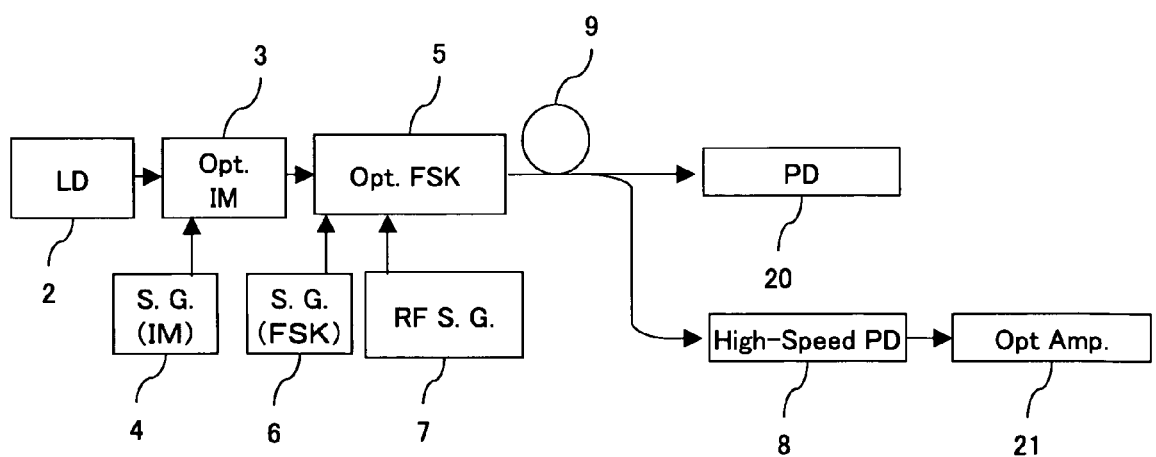
FIG. 6 is a schematic diagram showing a basic arrangement of an intensity modulating signal/UWB signal generator according to the present invention according to the present invention.

FIG. 6 is a schematic diagram showing a basic arrangement of the intensity modulating signal/UWB signal generator according to the present invention. As shown in FIG. 6, the intensity modulating signal/UWB signal generator according to the present invention includes a laser light source 2, a light intensity modulator 3, a signal source 4 of the light intensity modulator, an optical frequency shift keying modulator 5, a switching signal source 6 of the optical FSK modulator, a high-frequency electric signal source 7 of the optical FSK modulator, a high-speed optical detector 8 for detecting an output from the optical FSK modulator, a photodetector 20, and a light intensity amplifier 21, which serves as an arbitrary element, for amplifying an output from the high-speed photodetector. Of these elements, the elements described in the UWB signal generator according to the present invention are the same as those described above.

A photodetector is a device for detecting an optical signal, for which a known photodetector can be adopted. For example, a device including photodiode can be adopted as such a photodetector. As the photodetector, a photodetector which can detect and convert the optical signal into an electric signal can be mentioned. The photodetector can detect an intensity or the like of an optical signal. A detection band of the photodetector may be larger than $\Delta f_{sig}$ and smaller than twice $\Delta f_{FSK}$.

An amplifier (for example, a limiting amplifier) can suppress an intensity modulation component by using a saturation phenomenon. To pass through the amplifier to make it possible to output a UWB signal the intensity modulating component is suppressed. Therefore, the use of the amplifier is effective for an intensity modulating signal/UWB signal generator. In order to effectively suppress the intensity modulating component as described above, an ON/OFF extinction ratio of the intensity modulating signal is set at 20 dB or less. When such an ON/OFF extinction ratio is set, an almost constant UWB signal output can be obtained by using the saturation characteristics of the amplifier.

Since the optical FSK modulator kept an average output light intensity constant, when an intensity modulating signal is input, the intensity modulating signal/UWB signal generator can simultaneously transmit the intensity modulating signal and the UWB signal without affecting the intensity modulating signal. The intensity of the UWB signal is affected by the intensity modulating signal. However, when this causes a problem, a fluctuation in intensity can be suppressed by using an amplifier (limiting amplifier or the like).

A simulation ("Example 1") was performed whereas generation of a UWB signal by optical FSK modulation was analyzed by using an optical communication system simulator Optisystem™ 2.2. In this simulation, an FSK frequency modulation ($f_m$) was set at 10 GHz, and an induced phases obtained by the $RF_A$ and $RF_B$ electrodes were set at 1.48 rad. An FSK switching signal is a sinusoidal pulse having a repetition frequency of 200 MHz and a duty ratio of 50%, and the rise time and fall time for the FSK switching signal were set at 100 ps each.

Figure 7:
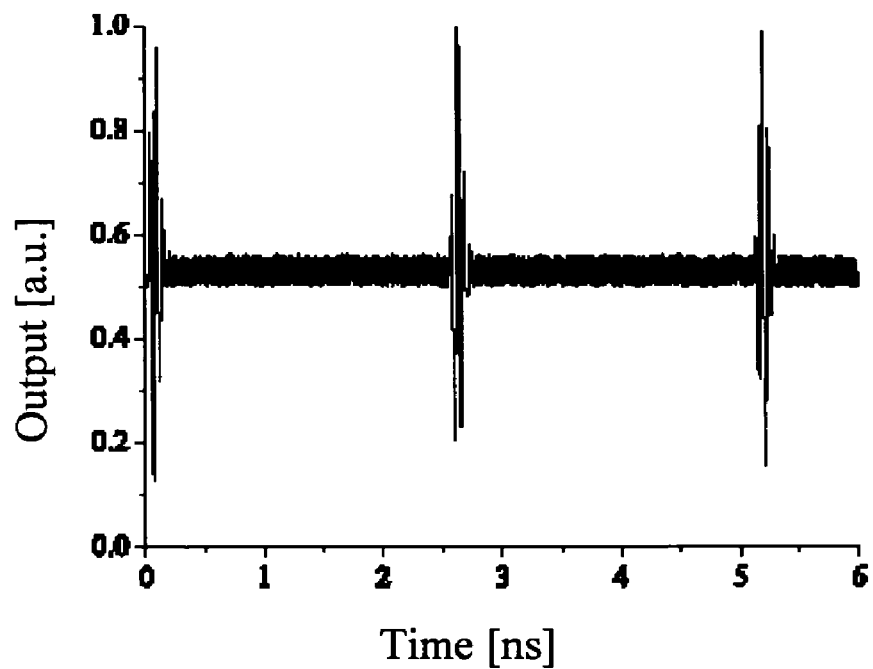
FIG. 7 is a graph showing a time waveform of a UWB signal calculated in the first embodiment.
Figure 8:
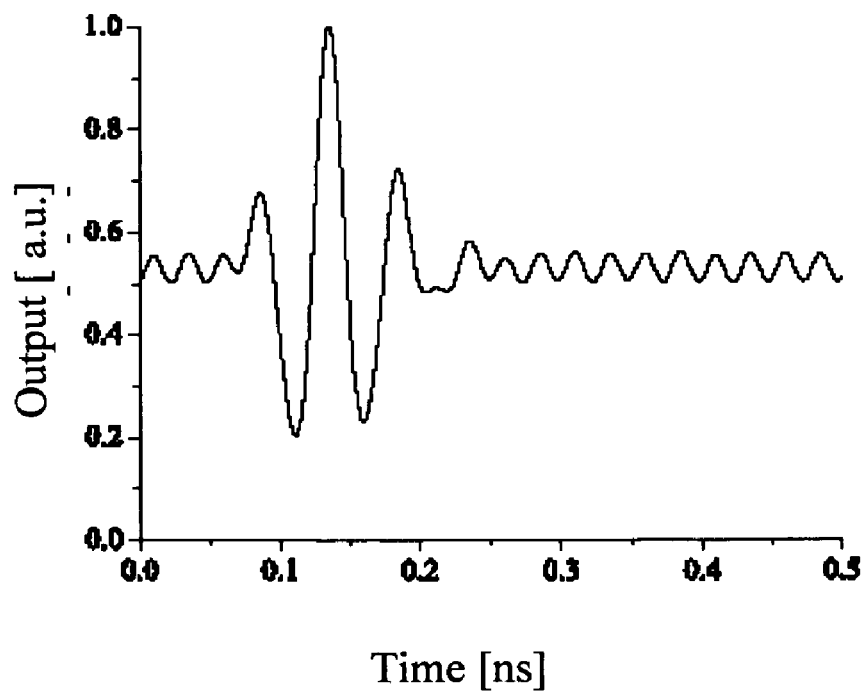
FIG. 8 is a graph obtained by enlarging the graph in FIG. 7.

FIGS. 7 and 8 show a time waveform of a UWB signal generated in this simulation. FIG. 8 is an enlarged graph of FIG. 7. As is apparent from FIGS. 7 and 8, an RF pulse having a constant average power is generated. A pulse width of the UWB signal is 110 ps, which is almost equal to the rise time of the switching signal.

Figure 9:
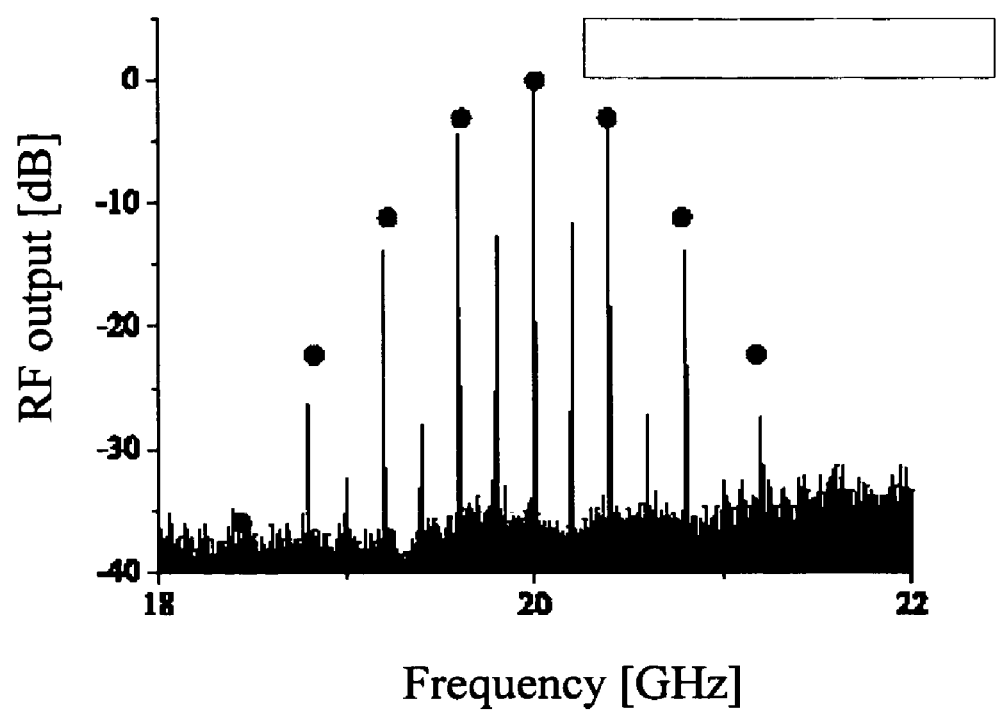
FIG. 9 is a graph showing spectra and calculation results of a UWB signal generated in the second embodiment.
Figure 10:
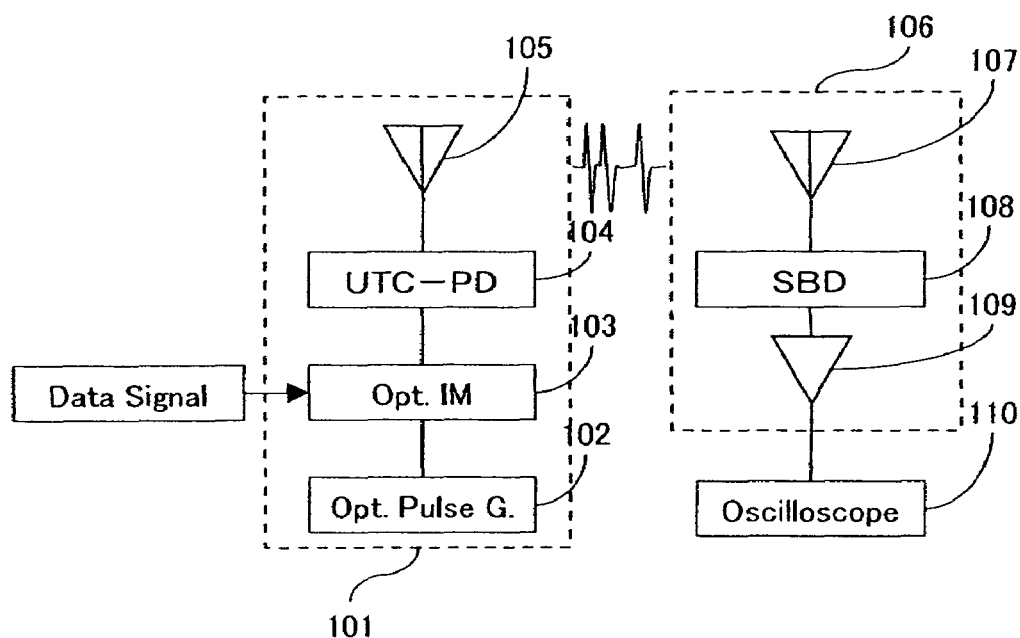
FIG. 10 is a diagram showing a UWB signal generator based on an IR method described in IEICE Proceedings of the 2003 Electronics Society, p. 343.

Separately, an experiment under the conditions in Example 1 was performed to generate a UWB signal. FIG. 9 shows a spectrum of the generated UWB signal. As is apparent from FIG. 9, a UWB signal can be output by using the UWB signal generator according to the present invention. FIG. 9 also shows calculation results (black circles). In numerical calculation, only a UWB signal having an even-number-order component is generated. However, a spectrum obtained by the experiment includes a UWB signal having an odd-number-order component (smaller than the even-number-order component by −10 dB or less). This is because the extinction ratio of the modulator has a finite value.

A UWB signal generator according to the present invention can be used as a novel UWB signal generator or the like in the field of information communication.

According to the UWB signal generator of the present invention, when a signal band is sufficiently different from a carrier frequency of a UWB signal, a UWB pulse can be superposed on an intensity modulating signal without waveform multiplexing. According to the UWB signal generator of the present invention, a new function of a fiber wireless system can be given to an FTTH system, which is popularized.

In the intensity modulating signal/UWB signal generator of the present invention, a UWB signal fiber wireless system can be realized by using optical fibers laid for an FTTH system using an existing IMDD. Since this system does not use a wavelength multiplexing technique, when a system on a transmission side is upgraded into a system which can simultaneously transmit both signals, an optical fiber need not be additionally established. Therefore, function enhancement can be advanced without adversely affecting existing services.

What is claimed is:

1. A UWB (Ultra-Wide Band) signal generator comprising:
   a laser light source for generating a laser light;
   an optical intensity modulator for modulating an intensity of the laser light from the laser light source;
   a signal source of the optical intensity modulator for outputting a signal transmitted to the optical intensity modulator;
   an optical frequency shift keying (optical FSK) modulator to which output light from the optical intensity modulator is input, the optical FSK modulator comprising a main Mach-Zehnder waveguide ($MZ_C$), the $MZ_C$ comprising a first sub Mach-Zehnder waveguide ($MZ_A$) and a second sub Mach-Zehnder waveguide ($MZ_B$), the $MZ_C$ comprising an optical input unit which is connected to the $MZ_A$ and the $MZ_B$, the $MZ_C$ comprising an output unit for modulated light, the output unit being connected to the $MZ_A$ and the $MZ_B$, the $MZ_A$ comprising a first radio-frequency electrode ($RF_A$ electrode), the $RF_A$ electrode being used for inputting a radio frequency (RF) signal to two arms constituting the $MZ_A$, the $MZ_B$ comprising a second radio-frequency electrode ($RF_B$ electrode), the $RF_B$ electrode being used for inputting a radio-frequency (RF) signal to two arms constituting the $MZ_B$, the $MZ_C$ comprising a third radio-frequency electrode ($RF_C$ electrode), the $RF_C$ electrode being used for shifting an output frequency of the light from the output of the optical FSK modulator by adjusting the bias voltage of the $RF_C$ electrode;
   a signal source for controlling a signal transmitted to the $RF_C$ electrode of the optical FSK modulator;
   a high-frequency electric signal source for controlling a signal transmitted to the $RF_A$ electrode and the $RF_B$ electrode of the optical FSK modulator; and
   a high-speed photodetector for detecting an output from the optical FSK modulator.

2. A UWB signal generator according to claim 1, wherein the optical FSK modulator further comprises:
   a first direct-current or low-frequency electrode ($DC_A$ electrode) which controls a bias voltage between the two arms constituting the $MZ_A$ to control a phase of light propagating in the two arms of the $MZ_A$; and
   a second direct-current or low-frequency electrode ($DC_B$ electrode) which controls a bias voltage between the two arms constituting the $MZ_B$ to control a phase of light propagating in the two arms of the $MZ_B$;
   wherein the $RF_C$ electrode is a traveling-wave type electrode.

3. An apparatus which can generate an intensity modulating signal and a UWB (Ultra-Wide Band) signal, the apparatus comprising a UWB signal generator and a photodetector:
   wherein the UWB signal generator comprises:
   a laser light source for generating laser light;
   an optical intensity modulator for modulating an intensity of the laser light from the laser light source;
   a signal source of the optical intensity modulator for outputting a signal transmitted to the optical intensity modulator;
   an optical frequency shift keying (optical FSK) modulator for inputting output light from the optical intensity modulator, the optical FSK modulator comprising a main Mach-Zehnder waveguide ($MZ_C$), the $MZ_C$ comprising a first sub Mach-Zehnder waveguide ($MZ_A$) and a second sub Mach-Zehnder waveguide ($MZ_B$), the $MZ_C$ comprising an optical input unit which is connected to the $MZ_A$ and the $MZ_B$, the $MZ_C$ comprising an output unit for modulated light, the output unit being connected to the $MZ_A$ and the $MZ_B$, the $MZ_A$ comprising a first radio-frequency electrode ($RF_A$ electrode), the $RF_A$ electrode being used for inputting a radio frequency (RF) signal to two arms constituting the $MZ_A$, the $MZ_B$ comprising a second radio-frequency electrode ($RF_B$ electrode), the $RF_B$ electrode being used for inputting a radio frequency (RF) signal to two arms constituting the $MZ_B$, the $MZ_C$ comprising a third radio-frequency electrode ($RF_C$ electrode), the $RF_C$ electrode being used for shifting an output frequency of the light from the output of the optical FSK modular by adjusting the bias voltage of the $RF_C$ electrode;
   a signal source for controlling a signal transmitted to the $RF_C$ electrode of the optical FSK modulator; and
   a high frequency electric signal source for controlling a signal transmitted to the $RF_A$ electrode and the $RF_B$ electrode of the optical FSK modulator;
   wherein the photodetector is combined to the UWB signal generator.

4. The apparatus according to claim 3, further comprising:
   an intensity amplifier for amplifying an output from the photodetector.

5. The apparatus according to claim 3, wherein the optical FSK modulator further comprises:
   a first DC or low-frequency electrode ($DC_A$ electrode) which controls a bias voltage between the two arms constituting the $MZ_A$, to control a phase of light propagating in the two arms of the $MZ_A$; and
   a second direct-current or low-frequency electrode ($DC_B$ electrode) which controls a bias voltage between the two arms constituting the $MZ_B$ to control a phase of light propagating in the two arms of the $MZ_B$;

wherein the $RF_C$ electrode is a travelling-wave type electrode.

6. The apparatus according to claim 4, wherein the optical FSK modulator further comprises:

a first DC or low-frequency electrode ($DC_A$ electrode) which controls a bias voltage between the two arms constituting the $MZ_A$ to control a phase of light propagating in the two arms of the $MZ_A$; and a second direct-current or low-frequency electrode ($DC_B$ electrode) which controls a bias voltage between the two arms constituting the $MZ_B$ to control a phase of light propagating in the two arms of the $MZ_B$;

wherein the $RF_C$ electrode is a traveling-wave type electrode.

7. A wavelength division multiplexing communication system comprising a UWB (Ultra-Wide Band) signal generator, wherein the UWB signal generator comprises:

a laser light source for generating a laser light;

an optical intensity modulator for modulating an intensity of the laser light from the laser light source;

a signal source of the optical intensity modulator for outputting a signal transmitted to the optical intensity modulator;

an optical frequency shift keying (optical FSK) modulator to which output light from the optical intensity modulator is input, the optical FSK modulator comprising a main Mach-Zehnder waveguide ($MZ_C$), the $MZ_C$ comprising a first sub Mach-Zehnder waveguide ($MZ_A$) and a second sub Mach-Zehnder waveguide ($MZ_B$), the $MZ_C$ comprising an optical input unit which is connected to the $MZ_A$ and the $MZ_B$, the $MZ_C$ comprising an output unit for modulated light, the output unit being connected to the $MZ_A$ and the $MZ_B$, the $MZ_A$ comprising a first radio-frequency electrode ($RF_A$ electrode), the $RF_A$ electrode being used for inputting a radio frequency (RF) signal to two arms constituting the $MZ_A$, the $MZ_B$ comprising a second radio-frequency electrode ($RF_B$ electrode), the $RF_B$ electrode being used for inputting a radio frequency (RF) signal to two arms constituting the $MZ_B$, the $MZ_C$ comprising a third radio-frequency electrode ($RF_C$ electrode), the $RF_C$ electrode being used for shifting an output frequency of the light from the output of the optical FSK modulator by adjusting the bias voltage of the $RF_C$ electrode;

a signal source for controlling a signal transmitted to the $RF_C$ electrode of the optical FSK modulator;

a high-frequency electric signal source for controlling a signal transmitted to the $RF_A$ electrode and the $RF_B$ electrode of the optical FSK modulator; and a high-speed photodetector for detecting an output from the optical FSK modulator.

8. A wavelength division multiplexing communication system according to claim 7, wherein the optical FSK modulator further comprises:

a first direct-current or low-frequency electrode ($DC_A$ electrode) which controls a bias voltage between the two arms constituting the $MZ_A$ to control a phase of light propagating in the two arms of the $MZ_A$; and a second direct-current or low-frequency electrode ($DC_B$ electrode) which controls a bias voltage between the two arms constituting the $MZ_B$ to control a phase of light propagating in the two arms of the $MZ_B$;

wherein the $RF_C$ electrode is a traveling-wave type electrode.

* * * * *